S. DARLING.
Dividing-Engine.

No. 227,962.  Patented May 25, 1880.

Witnesses.
Geo. H. Smith
Benj. Gridley

Inventor.
Samuel Darling

UNITED STATES PATENT OFFICE.

SAMUEL DARLING, OF PROVIDENCE, RHODE ISLAND.

DIVIDING-ENGINE.

SPECIFICATION forming part of Letters Patent No. 227,962, dated May 25, 1880.

Application filed January 10, 1880.

*To all whom it may concern:*

Be it known that I, SAMUEL DARLING, of the city of Providence and State of Rhode Island, have invented a new and useful Improvement in the Process of Comparing and Applying to Use Mathematical and other Instruments of Precision; and I hereby declare that the following, taken in connection with the drawings which accompany and form part of this specification, is a description sufficient to enable those skilled in the art to practice it.

The object of my invention is to produce and maintain a uniform temperature in mathematical instruments or any mechanical apparatus used for accurate measurements or comparisons, and in the articles of mechanism to which these instruments or apparatus are applied in use, and also to make the temperature of any degree required; and it consists in applying a current of air to such instruments or apparatus during the process of comparing them together, or of comparing one part with other parts of the same instrument, and of testing other articles of mechanism with these instruments, and also in making the current of air of any degree of temperature required by warming or cooling it before or as it passes through the blowing apparatus, whereby great accuracy in comparisons and measurements may be obtained.

In the drawings, Figure 1 represents a vertical section of a table, blower, and wind-pipe at line *x x*, Fig. 2, and a front side elevation of a screw and two microscopes; Fig. 2, a transverse section of the table, screw, and wind-pipe, a side elevation of one of the microscopes, and back elevation of a blower; Fig. 3, a transverse section of a table, two scales, air-pipe, side elevation of a microscope and blower; Fig. 4, a transverse section of a table, graduated scale, wind-pipe, and case inclosing the scale and microscopes, and a side elevation of one of the microscopes. Fig. 5 represents a side elevation of a cylindrical and a caliper gage. Fig. 6 represents a vertical cross-section of a cooling apparatus.

Letter A represents a table, upon which rest the articles to be compared or measured; B, a fan-blower; C, an air-pipe for conveying the air from the blower to the articles to be tested or measured; D, opening in the air-pipe through which the air is forced upon the articles being operated upon; E, microscopes; F, shield between the operator and the articles being tested; G, screw to be tested; H, Fig. 3, standard measure of length; I, scale being compared with the standard H. J, Fig. 4, represents a case inclosing the articles to be compared or measured; K, hinged cover; L, cover turned back; M, opening through which the air passes out of the case; N, Fig. 5, a standard cylindrical gage; O, standard caliper-gage for testing the cylindrical gage. P, Fig. 6, represents an ice-chamber; Q, air-chamber through which the air passes to the blower; R, metallic partition between the air and ice chambers; S, sliding shutter between the air-chamber Q and the partition R.

Change in temperature is the greatest hinderance to accuracy in the use of mathematical instruments that there is to contend with. It is more difficult than inaccuracy in the instruments, for that will always be the same, while the temperature is constantly changing. A change of one degree in the temperature of a steel bar alters it six-millionths of its length, and in a brass bar nearly double that amount, which would be about .00025 of an inch in a steelyard-measure. When comparing one part of a graduated scale with other parts of itself to ascertain whether the graduation is homogeneous the temperature of the scale must be uniform throughout, and remain so during the process, and when one scale is compared with another both must be of the same temperature and uniform in every part.

Heretofore there has been no satisfactory way known of producing and maintaining a uniform temperature in mathematical instruments and the articles which they are applied to in use. It takes a great length of time for a piece of metal to change to a higher or lower degree of temperature of a room in which it may be placed by merely exposing its surface to the air in the room, and as the temperature of a room is constantly changing the temperature of a metallic article cannot be known by the temperature of the room; and when from any cause one part of a scale or long metallic bar is of a different temperature from the other parts it takes a long time (the larger the bar the longer it takes) for the temperature to become sufficiently uniform in the whole piece for accurate measurement, and its temperature is at all times liable to be changed by warmth from the operator and other causes.

Water is sometimes used to regulate the temperature; but that is quite unreliable and inconvenient. The exact temperature of anything can never be known, and it is only necessary to know to that degree of exactness required by the result to be obtained. A piece of metal or any substance of a temperature of, say, 59°, put in a room of 60°, would never be exactly 60° as long as the temperature of the room remained at a temperature of 60°; but if the metal at 59° should remain in the room a thousand years and the temperature of the room remain exactly at 60°, I would not deny but that the temperature of the piece of metal and the temperature of the room would be quite near enough alike for practical purposes.

By experiment I find that if the temperature of a thermometer be raised above or lowered below that of the room in which it is placed and then exposed to a strong current of air from a blower in the same room, as herein described, its temperature will change to the temperature of the room about ten times as rapidly as it will by merely exposing it to the static air of the room, by which will be seen the advantage of the use of a blower.

One hour's time would be sufficient to blow upon scales of common sizes to produce a sufficiently uniform temperature in most cases, and it is quite often that the temperature of a room will remain the same for that length of time, and if it should change even one or two degrees during that hour the change would be so slow that the article in the current of air would change correspondingly.

Without the use of a blower the temperature of mathematical instruments and the articles to which they are applied is constantly liable to change by the presence and manipulations of the operator, which is not the case when the blower is used. In passing through the blowing apparatus the temperature of the air is raised a little—say one-half of a degree Fahrenheit, more or less, according to the speed of the blower, shape, finish, and position of the blowing apparatus.

It is preferable to have the air after it has passed through the blower and the air of the room of the same temperature, to accomplish which it is necessary to cool the air sufficiently, before or as it passes through the blowing apparatus, to offset what the temperature is raised in passing through it.

When scales made of different metals, as steel and brass, are to be compared together, it is necessary to know their exact temperature, and it is often necessary to have them compared at a special degree.

I make the air at any degree of temperature required by an apparatus represented in Fig. 6, in which P is an apartment for ice, cold air, or any cold substance; or it may be heated instead, if the temperature wanted require it. R is a metallic partition. S is a sliding shutter, made of wood or some other slow conductor of heat; and there may be an air-chamber, which may or may not be filled with a non-conducting substance, between partition R and shutter S, to more effectually prevent the air in chamber Q from being cooled or warmed by what may be in apartment P when the shutter is closed.

The air passes through chamber Q into pipe C, which is connected with a blower.

It will be seen that the more the shutter S is opened the more of the surface of the metallic partition will be exposed to the air in chamber Q and the more the air will be affected by it.

In cold weather the outdoor air will answer instead of the cold chamber P, and there are many ways of applying heat to the air before or as it passes through the wind-pipe when warmer air is required.

The shutter S must be arranged to be opened and closed with facility by the operator where it is most convenient for his purpose, or it may be opened and closed automatically by the change of temperature by any of the known devices for that purpose.

To make the air of a higher temperature than the room, heat by gas or oil burners may be applied to the exterior of the wind-pipe before it comes to the blower.

Figs. 1 and 2 represent a screw in the process of being examined with microscopes to see if the pitch is homogeneous, which is done by comparing one part with other parts of itself.

To make an accurate comparison of a screw with itself or with another screw or graduated scale, the wind should be blown in full force upon the screw (if about two inches in diameter, longer or shorter, according to size) for about one hour before commencing the process, and sufficiently during the process to prevent the temperature from changing.

In comparing two scales together, as shown in Fig. 3, the wind blows on both at the same time, and after the microscopes have been adjusted to one scale, H, that is removed, and the other scale, I, is put in its place and adjusted to the microscopes, taking care that the manipulation does not change the temperature.

Figure 1:
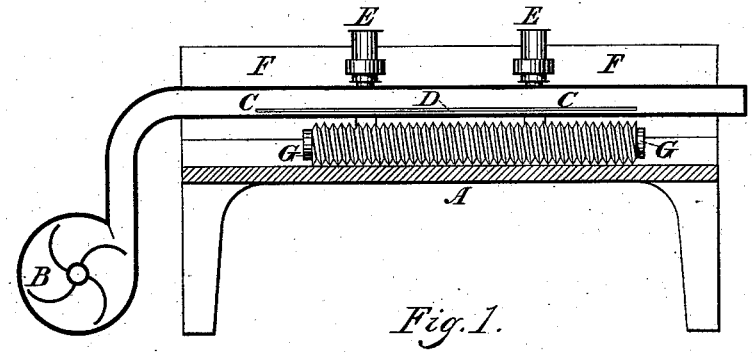
Figures 2, 3:
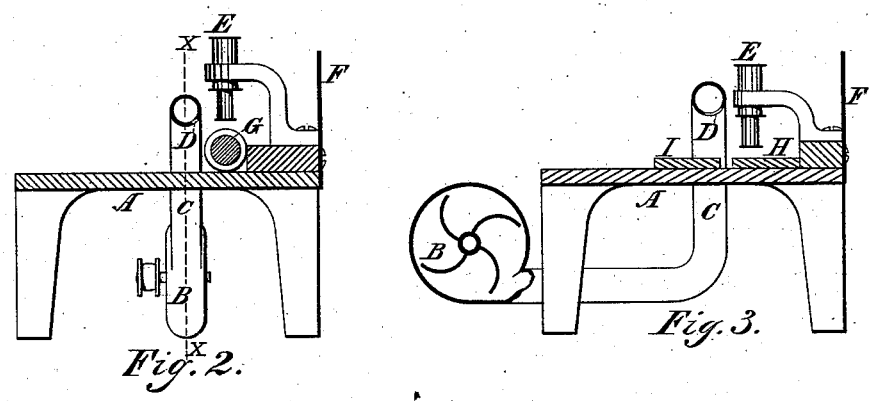
Figure 4:
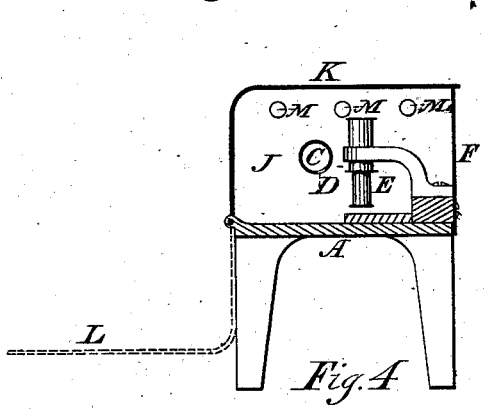
Fig. 4 represents a scale being compared with itself to test the accuracy of the graduation. In this case the scale is inclosed in a case, the top of which is thrown back when the microscopes and scale are to be manipulated.
Figures 5, 6:
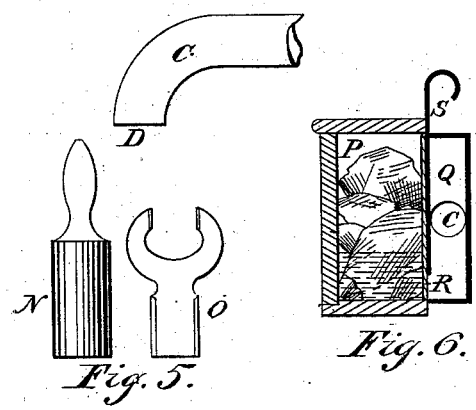
Fig. 5 represents the process of testing a cylindrical gage with a caliper-gage. The wind is to be forced upon them both at the same time until they are of uniform temperature, and great care must be taken not to change it by manipulation or heat from the operator.

Having fully explained my invention, what I claim, and desire to secure by Letters Patent, is—

1. A blowing apparatus, when used for regulating the temperature of mathematical instruments while being compared together, or used for measuring and testing other articles of mechanism, substantially as herein described.

2. The combination of table A, blower B, and graduated scale H, substantially as described, and for the purpose set forth.

3. The combination of a mathematical instrument or any article of mechanism, a blower, current of air, and an apparatus for changing the temperature of the air before or as it passes through the blowing apparatus, substantially as herein described.

SAMUEL DARLING.

Witnesses:
 JOHN E. HALL,
 HENRY DRURY.